(12) United States Patent
Everette et al.

(10) Patent No.: US 10,235,038 B2
(45) Date of Patent: Mar. 19, 2019

(54) ELECTRONIC SYSTEM WITH PRESENTATION MECHANISM AND METHOD OF OPERATION THEREOF

(71) Applicant: Samsung Electronics Co., Ltd., Suwon-si, Gyeonggi-Do (KR)

(72) Inventors: Neil Everette, San Jose, CA (US); Cheryl Sedota, Mount Pleasant, SC (US); Syyean Hwu Gastelum, Santa Clara, CT (US); Devon Wang, Santa Clara, CA (US); Maverick Velasco, Morgan Hill, CA (US); Eujin Lee, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 352 days.

(21) Appl. No.: 14/337,219

(22) Filed: Jul. 22, 2014

(65) Prior Publication Data

US 2015/0066165 A1 Mar. 5, 2015

Related U.S. Application Data

(60) Provisional application No. 61/873,321, filed on Sep. 3, 2013, provisional application No. 61/987,481, filed on May 1, 2014.

(51) Int. Cl.
| | |
|---|---|
| *G06F 3/048* | (2013.01) |
| *G06F 3/0488* | (2013.01) |
| *G06F 3/0482* | (2013.01) |
| *G06F 3/0485* | (2013.01) |
| *G06F 3/0481* | (2013.01) |

(52) U.S. Cl.
CPC ........ *G06F 3/04883* (2013.01); *G06F 3/0482* (2013.01); *G06F 3/0485* (2013.01); *G06F 3/0481* (2013.01); *G06F 2200/1614* (2013.01); *G06F 2203/04803* (2013.01); *G06F 2203/04804* (2013.01)

(58) Field of Classification Search
None
See application file for complete search history.

(56) References Cited

U.S. PATENT DOCUMENTS

| | | | | |
|---|---|---|---|---|
| 7,295,995 | B1 * | 11/2007 | York | G06Q 30/02 705/26.8 |
| 7,360,167 | B2 | 4/2008 | Hennum et al. | |
| 8,537,180 | B1 * | 9/2013 | Grieve | G09G 5/34 345/173 |
| 2002/0163546 | A1 * | 11/2002 | Gallo | G06F 3/0481 715/848 |

(Continued)

OTHER PUBLICATIONS

Wei Ma et al., Fast interactive stereo image segmentation, Springer Science Business Media, Aug. 6, 2015, vol. 75, pp. 10935-10948 (Year: 2015).*

*Primary Examiner* — Tam T Tran

(57) ABSTRACT

An electronic system includes: a user interface configure to provide a plurality of an interface panel less than a display threshold for displaying on a device; and a control unit, coupled to the user interface configured to: determine a panel position for determining a view type for the plurality of the interface panel, and determine a panel dimension based on the panel position for expanding the interface panel in a focus position for displaying a subpanel.

25 Claims, 9 Drawing Sheets

(56) References Cited

U.S. PATENT DOCUMENTS

| | | | |
|---|---|---|---|
| 2004/0103376 A1* | 5/2004 | Pandey | E21B 41/00 715/211 |
| 2007/0287432 A1* | 12/2007 | Jung | G06Q 10/107 455/414.1 |
| 2009/0002335 A1* | 1/2009 | Chaudhri | G06F 3/04815 345/173 |
| 2009/0106691 A1* | 4/2009 | Ballard | G06F 3/0481 715/798 |
| 2010/0192065 A1* | 7/2010 | Se | G06F 3/0482 715/719 |
| 2011/0122078 A1* | 5/2011 | Kasahara | G06F 3/0488 345/173 |
| 2013/0097555 A1 | 4/2013 | Marantz et al. | |
| 2013/0346882 A1* | 12/2013 | Shiplacoff | G06F 3/04842 715/753 |
| 2014/0215398 A1* | 7/2014 | Fleizach | G06F 3/0487 715/823 |
| 2014/0325418 A1* | 10/2014 | Tullis | G06F 3/017 715/771 |
| 2015/0205446 A1* | 7/2015 | Kuscher | G06F 3/0481 715/798 |

* cited by examiner

ELECTRONIC SYSTEM WITH PRESENTATION MECHANISM AND METHOD OF OPERATION THEREOF

CROSS-REFERENCE TO RELATED APPLICATION(S)

This application claims the benefit of U.S. Provisional Patent Application Ser. No. 61/873,321 filed Sep. 3, 2013, and the subject matter thereof is incorporated herein by reference thereto.

This application claims the benefit of U.S. Provisional Patent Application Ser. No. 61/987,481 filed May 1, 2014, and the subject matter thereof is incorporated herein by reference thereto.

TECHNICAL FIELD

An embodiment of the present invention relates generally to an electronic system, and more particularly to a system for presentation mechanism.

BACKGROUND

Modem portable consumer and industrial electronics, especially client devices such as navigation systems, cellular phones, portable digital assistants, and combination devices are providing increasing levels of functionality to support modem life including location-based information services. Research and development in the existing technologies can take a myriad of different directions.

As users become more empowered with the growth of mobile location based service devices, new and old paradigms begin to take advantage of this new device space. There are many technological solutions to take advantage of this new device location opportunity. One existing approach is to use location information to provide personalized content through a mobile device, such as a cell phone, smart phone, or a personal digital assistant.

Personalized content services allow users to create, transfer, store, and/or consume information in order for users to create, transfer, store, and consume in the "real world." One such use of personalized content services is to efficiently transfer or guide users to the desired product or service.

Electronic system and personalized content services enabled systems have been incorporated in automobiles, notebooks, handheld devices, and other portable products. Today, these systems aid users by incorporating available, real-time relevant information, such as advertisement, entertainment, local businesses, or other points of interest (POI).

Thus, a need still remains for an electronic system with presentation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems. Solutions to these problems have been long sought but prior developments have not taught or suggested any solutions and, thus, solutions to these problems have long eluded those skilled in the art.

SUMMARY

An embodiment of the present invention provides an electronic system including: a user interface configure to provide a plurality of an interface panel less than a display threshold for displaying on a device; and a control unit, coupled to the user interface configured to: determine a panel position for determining a view type for the plurality of the interface panel, and determine a panel dimension based on the panel position for expanding the interface panel in a focus position for displaying a subpanel.

An embodiment of the present invention provides a method of operation of an electronic system including: providing a plurality of an interface panel less than a display threshold for displaying on a device; determining a panel position with a control unit for determining a view type for the plurality of the interface panel; and determining a panel dimension based on the panel position for expanding the interface panel in a focus position for displaying a subpanel.

An embodiment of the present invention provides an electronic system having a user interface including: an interface page including a page opacity based on a page coverage; an interface panel within the interface page displayed in a view type based on a panel position; and a subpanel within the interface panel having an interface opacity different from the interface panel.

An embodiment of the present invention provides a non-transitory computer readable medium including instructions for execution by a control unit including: providing a plurality of an interface panel less than a display threshold for displaying on a device; determining a panel position for determining a view type for the plurality of the interface panel; and determining a panel dimension based on the panel position for expanding the interface panel in a focus position for displaying a subpanel.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
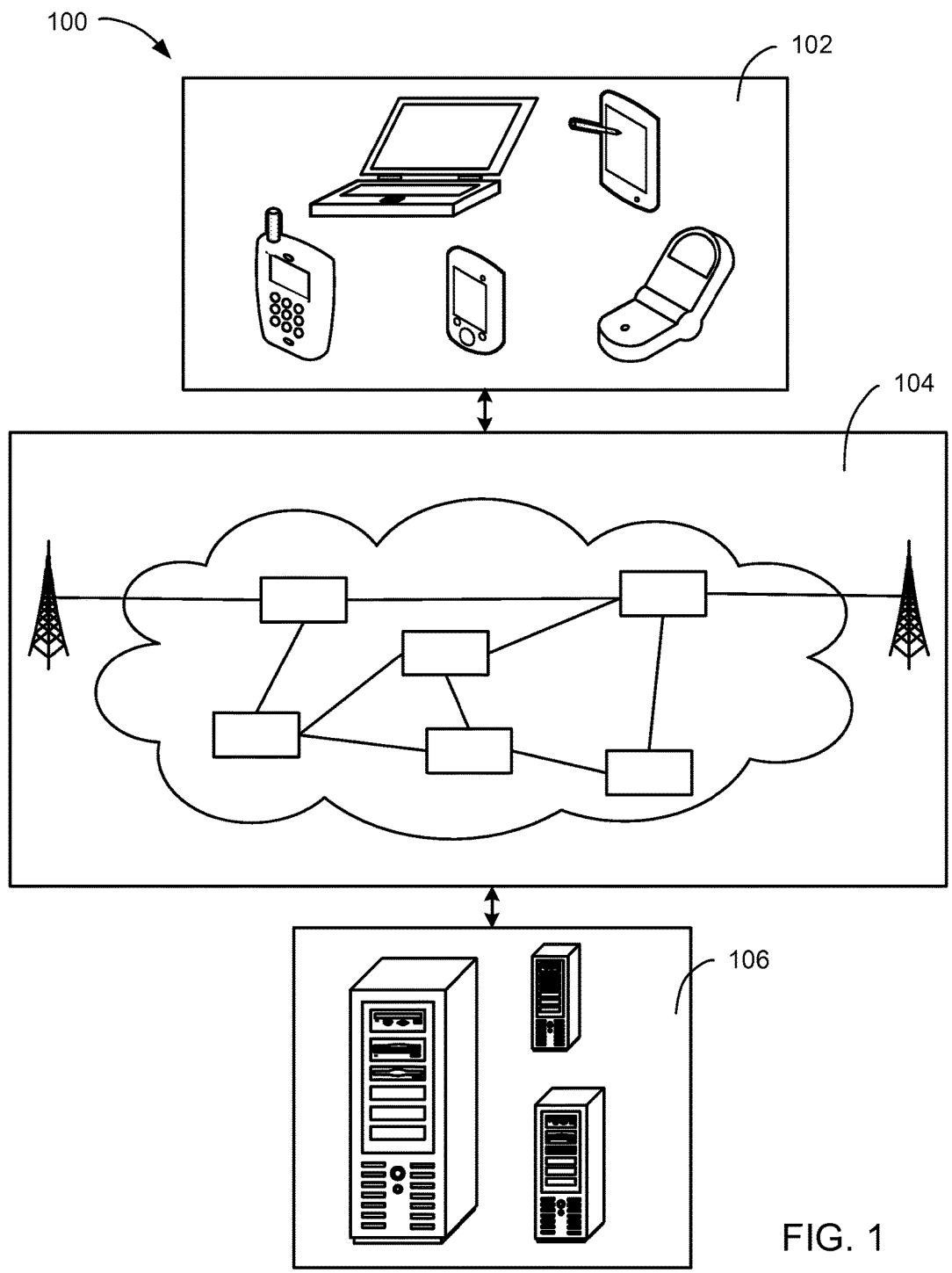
FIG. 1 is an electronic system with presentation mechanism in an embodiment of the present invention.

The following embodiments of the present invention provide an interface panel, a subpanel, an interface page, or a combination thereof including an interface opacity, a page opacity, or a combination thereof for providing a contrast in an interface color to improve readability of a content displayed on a display interface. An electronic system can adjust a panel dimension to expand or contract the interface panel based on whether the interface panel is at a focus position.

The following embodiments of the present invention provide a plurality of the interface panel less than a display threshold for displaying on a first device. By determining a panel position, the electronic system can determine a view type for a plurality of the interface panel. Further, by determining the panel dimension based on a panel position, the electronic system can expand the interface panel in the focus position for displaying a subpanel.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "relevant information" referred to herein includes the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof in the embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown an electronic system 100 with presentation mechanism in an embodiment of the present invention. The electronic system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of display devices, such as a cellular phone, personal digital assistant, wearable digital device, tablet, notebook computer, television (TV), automotive telematic communication system, or other multi-functional mobile communication or entertainment device. The first device 102 can be a standalone device, or can be incorporated with a vehicle, for example a car, truck, bus, aircraft, boat/vessel, or train. The first device 102 can couple to the communication path 104 to communicate with the second device 106.

For illustrative purposes, the electronic system 100 is described with the first device 102 as a display device, although it is understood that the first device 102 can be different types of devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, a rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, a personal digital assistant, or a cellular phone, and as specific examples, an Apple iPhone™, Android™ smartphone, or Windows™ platform smartphone.

For illustrative purposes, the electronic system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, aircraft, boat/vessel, or train.

Also for illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, wireless High-Definition Multimedia Interface (HDMI), Near Field Communication (NFC), Infrared Data Association standard (IrDA), wireless fidelity (WiFi), and worldwide interoperability for microwave access (WiMAX) are examples of wireless communication that can be included in the communication path 104. Ethernet, HDMI, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
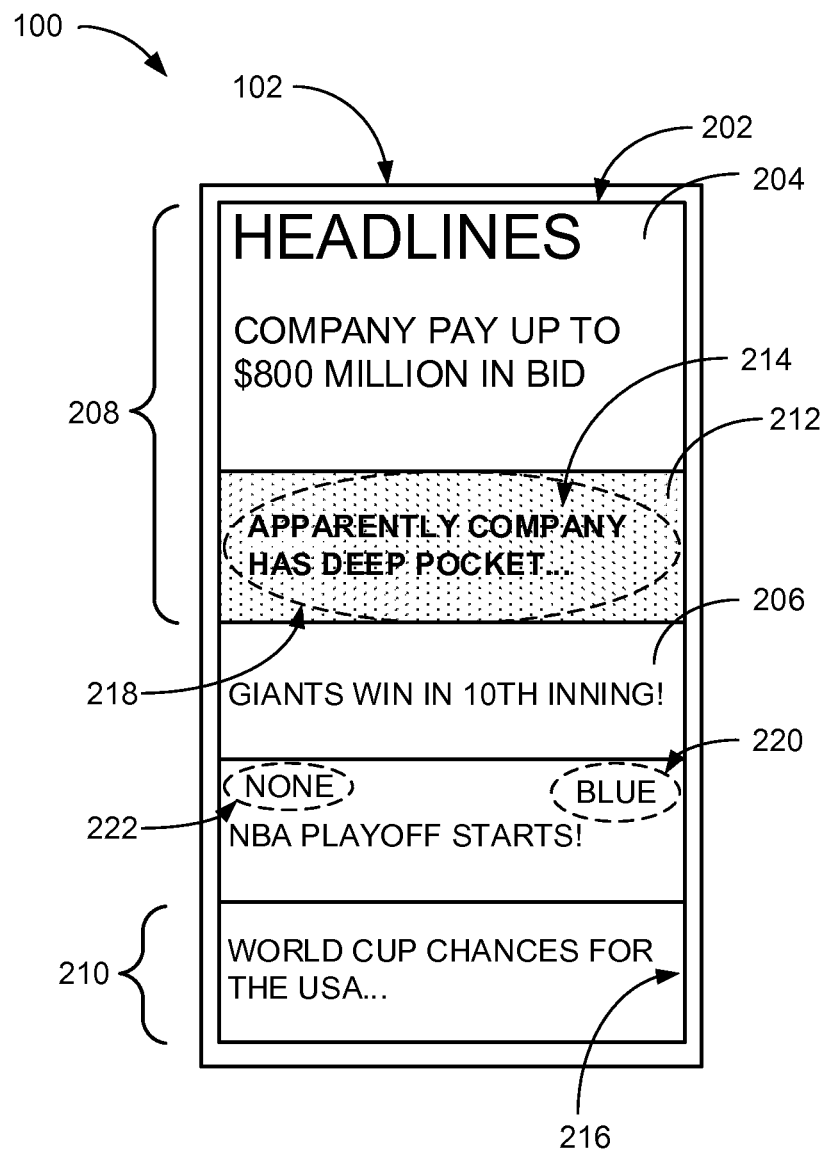
FIG. 2 is a first example of a display interface of the first device.

Referring now to FIG. 2, therein is shown a first example of a display interface 202 of the first device 102. For clarity and brevity, the discussion of the present invention will focus on the first device 102 displaying the result generated by the electronic system 100. However, the second device 106 of FIG. 1 and the first device 102 can be discussed interchangeably.

The display interface 202 is a surface of the first device 102 for interacting with the first device 102. The display interface 202 can display an interface panel 204. The interface panel 204 is a user interface for displaying a topic for a content. The interface panel 204 can represent a graphical user interface. For example, one instance of the interface panel 204 can display a topic regarding a business news article while another instance of the interface panel 204 can display another topic representing sports news. The interface panel 204 can include a view type 206, which is a categorization of a display format of the interface panel 204.

The view type 206 can include a peek view 208, a contracted view 210, or a combination thereof. The peek view 208 is the interface panel 204 in a display format for displaying a subpanel 212. The subpanel 212 is a section of the interface panel 204 for displaying a preview 214. The preview 214 is a sneak peek of additional content displayable on the interface panel 204. The contracted view 210 is the interface panel 204 in a display format without the subpanel 212.

A panel dimension 224 is spatial property of the interface panel 204. For example, the interface panel 204 in the peek view 208 can have a greater of the panel dimension 224 than the interface panel 204 in the contracted view 210. More specifically, the electronic system 100 can update the panel dimension 224 by adjusting an interface vertical side 216.

For further example, the interface vertical side 216 of the interface panel 204 in the peek view 208 can be longer than the interface vertical side 216 of the interface panel 204 in the contracted view 210. As discussed above, the interface vertical side 216 of the interface panel 204 in the peek view 208 can be longer to accommodate the display of the subpanel 212 including the preview 214. More specifically, the interface vertical side 216 can be at a maximum height when the interface panel 204 is in the peek view 208 and at minimum height when the interface panel 204 is in the contracted view 210.

An interface opacity 218 is a darkness level of the user interface. For example, the electronic system 100 can adjust the interface opacity 218 of the display interface 202, the interface panel 204, the subpanel 212, or a combination thereof. More specifically, the electronic system 100 can adjust the interface opacity 218 based on an interface color 220. The interface color 220 can represent the color displayed for the display interface 202, the interface panel 204, the subpanel 212, or a combination thereof. More specifically, the interface color 220 can represent the combination of the color red, blue, and green. A luminosity factor 222 is an element to brighten or darken the interface color 220.

Figure 3:
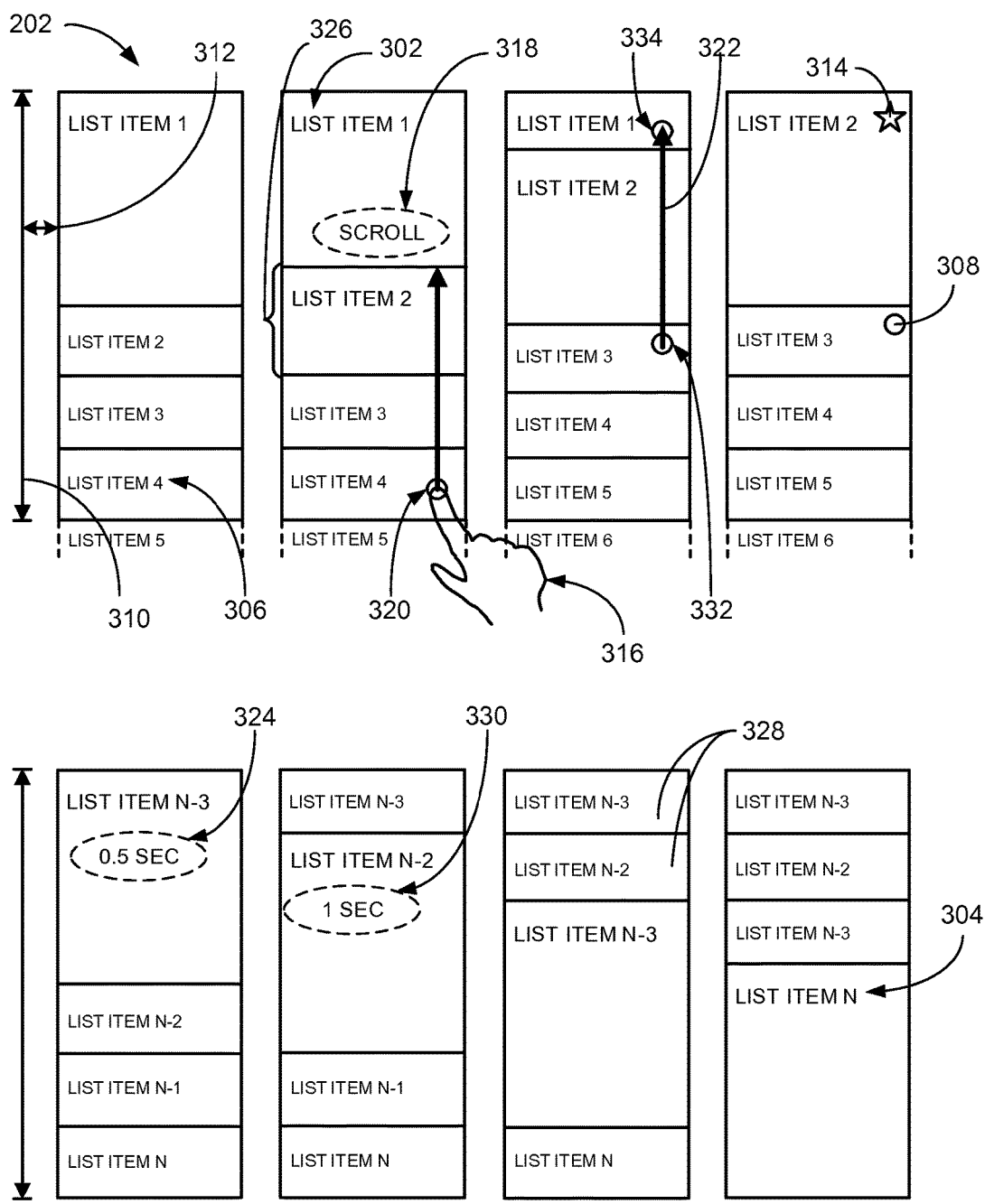
FIG. 3 is second examples of a display interface of the first device of FIG. 1.

Referring now to FIG. 3, therein is shown second examples of the display interface 202 of the first device 102 of FIG. 1. The display interface 202 can display a plurality of the interface panel 204 of FIG. 2 in an interface list 302. The interface list 302 is a series of a plurality of the interface panel 204. The interface list 302 can include an item count 304, which is a number of instances of the interface panel 204 in the interface list 302. For example, the interface list 302 can include the item count 304 of "N" number of instances of the interface panel 204.

A display threshold 306 is a limit on the number of instances of the interface panel 204 displayable on the display interface 202. For example, the display threshold 306 can represent four instances of the interface panel 204 displayable on the display interface 202. As showing in top most left figure of FIG. 3, the fifth instance of the interface panel 204 representing "LIST ITEM 5" can be outside of the display interface 202.

A panel position 308 is a location of the user interface within the display interface 202. A position type 310 can represent a category of a coordinate. The coordinate can represent an XY coordinate. For example, the position type 310 can include a vertical position 312. The vertical position 312 can represent the Y coordinate of the XY coordinate. For a specific example, the display interface 202 can be divided into rows representing a plurality of the vertical position 312. The Y coordinate of each row can represent an instance of the panel position 308.

The panel position 308 can include a focus position 314. The focus position 314 is the location within the display interface 202 where the interface panel 204 will be displayed in the peek view 208 of FIG. 2. As illustrated in top figures of FIG. 3, the focus position 314 can represent the vertical position 312 closest to the top extent of the display interface 202. For another example, as illustrated in bottom figures of FIG. 3, the focus position 314 can represent the vertical position 312 closest to the bottom extent of the display interface 202 when the Nth instance of the interface panel 204 from the interface list 302 is displayed on the display interface 202.

A user of the electronic system 100 of FIG. 1 can make a user entry 316 on the display interface 202. For example, the user entry 316 can be made by performing an instance of a gesture type 318 on the interface panel 204. The gesture type 318 is a category of the user entry 316. For example, the gesture type 318 can include a swipe, a long press, a scrub, a scroll, a tilt, or a combination thereof. An activation spot 320 is a location on the display interface 202 where a contact from the user entry 316 is detected.

A gesture direction 322 is a path taken by the user entry 316 contacting the display interface 202. For example, the gesture direction 322 can represent a vertical scroll starting from the bottom extent of the display interface 202 towards the top extent of the display interface 202. A gesture speed 324 is a rate of moving from an initial spot 332 to a subsequent spot 334. The initial spot 332 is the activation spot 320 first detected on the display interface 202. The subsequent spot 334 is the activation spot 320 detected after the initial spot 332 on the display interface 202. More specifically, the subsequent spot 334 can represent the activation spot 320 that the user entry 316 continually made contact on the display interface 202 and stopped from the initial spot 332.

An adjustment degree 326 is a rate of change for a height of the interface vertical side 216 of FIG. 2. As illustrated in top most right figure of FIG. 3, when the second instance of the interface panel 204 representing "LIST ITEM 2" moves into the focus position 314 original occupied by the first instance of the interface panel 204 representing "LIST ITEM 1," the interface vertical side 216 for the second instance of the interface panel 204 can expand to display the subpanel 212 of FIG. 2. The adjustment degree 326 can represent the rate of expansion of the interface vertical side 216 moving into the focus position 314. In contrast, the adjustment degree 326 can represent the rate of contraction of the interface vertical side 216 moving out of the focus position 314.

A moving set 328 is a fixed quantity of a plurality of the interface panel 204 for moving within the display interface 202 in response to the gesture type 318. A speed threshold 330 is a limit on the gesture speed 324 which would induce the moving of a plurality of the interface panel 204 in the moving set 328. For example, if the gesture speed 324 meets or exceeds the speed threshold 330, the electronic system 100 can scroll four instances of the interface panel 204 at a time rather than one instance of the interface panel 204.

Figure 4:
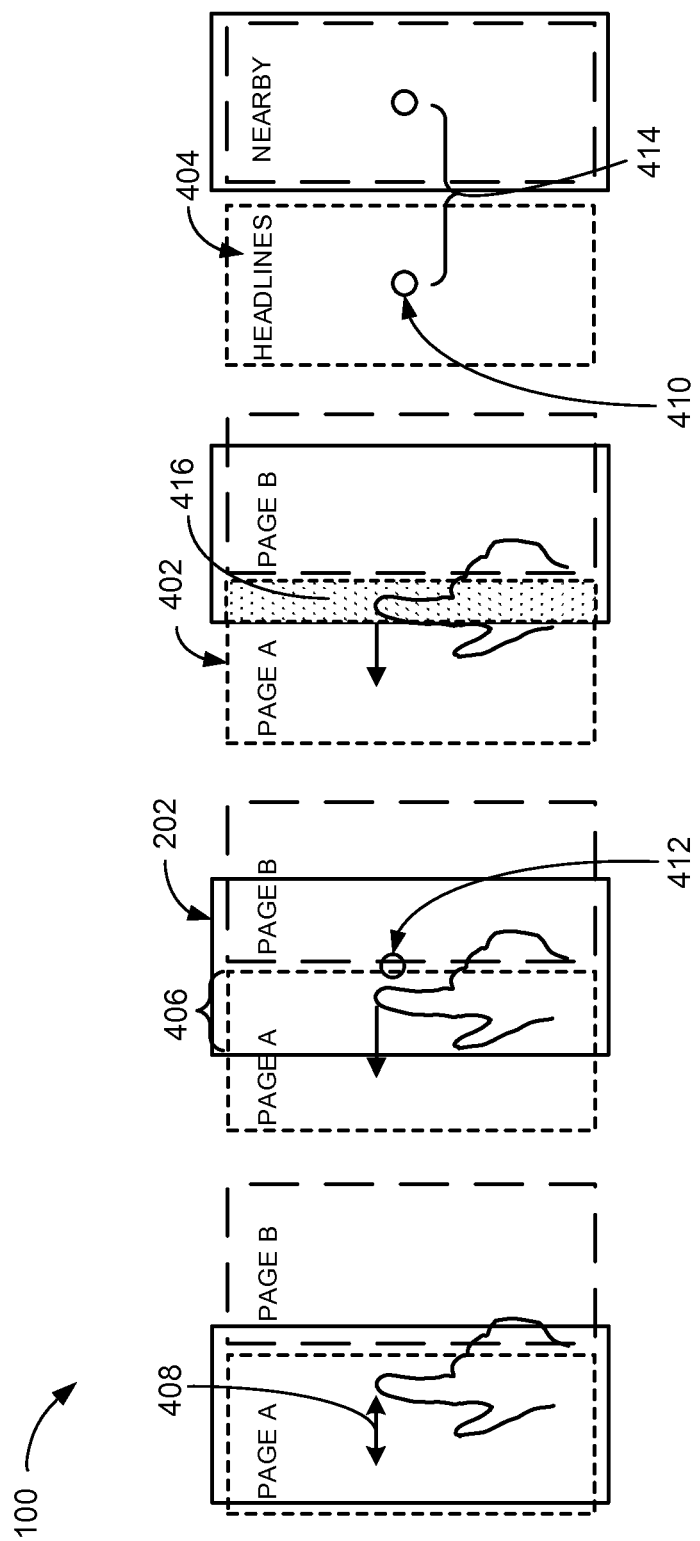
FIG. 4 is third examples of a display interface of the first device of FIG. 1.

Referring now to FIG. 4, therein is shown third examples of the display interface 202 of the first device 102 of FIG. 1. The display interface 202 can display a plurality of an interface page 402. The interface page 402 is a set of a plurality of the interface panel 204 of FIG. 2. For example, the interface page 402 can be categorized by a content type 404. The content type 404 is a category of content displayed on the interface panel 204, the interface page 402, or a combination thereof.

A page coverage 406 is an amount of a surface area of the display interface 202 covered by the interface page 402. For example, two instances of the interface page 402 can cover the page coverage 406 representing 50% each of the display interface 202. The page coverage 406 can be determined based on the position type 310 of FIG. 3 representing a horizontal position 408. The horizontal position 408 can represent the X coordinate of the XY coordinate.

The page coverage 406 can also be determined based on a page center 410, a display center 412, or a combination thereof. The page center 410 is a middle point of the interface page 402. The display center 412 is a middle point of the display interface 202. More specifically, the electronic system 100 can determine the page coverage 406 based on a distance difference 414 between the page center 410 and the display center 412. The distance difference 414 can represent a Euclidian distance between the page center 410 and the display center 412.

A page opacity 416 is a darkness level of the interface page 402. For example, the electronic system 100 can adjust the page opacity 416 based on the page coverage 406 of the interface page 402 over the display interface 202.

Figure 5:
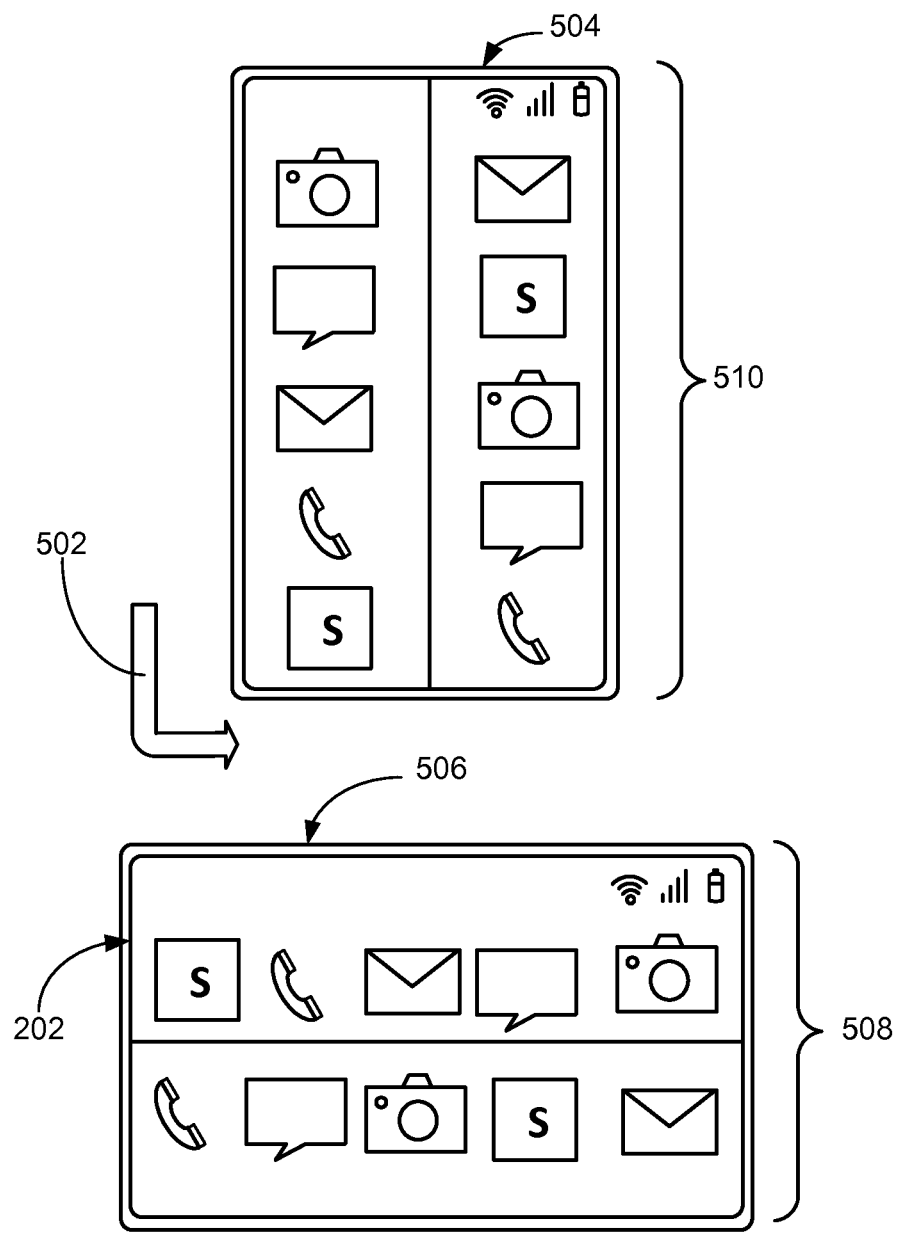
FIG. 5 is fourth examples of a display interface of the first device of FIG. 1.

Referring now to FIG. 5, therein is shown fourth examples of the display interface 202 of the first device 102 of FIG. 1. A device orientation 502 is a slant level of the first device 102. For example, the device orientation 502 can include a vertical mode 504 and a horizontal mode 506.

The vertical mode 504 is having a short display side 508 as a top and bottom extent of the first device 102. The horizontal mode 506 is having a long display side 510 as a top and bottom extent of the first device 102. The user entry 316 of FIG. 3 can represent performing the gesture type 318 of FIG. 3 representing a tilt to change the device orientation 502 from the vertical mode 504 to the horizontal mode 506 or vice versa.

Figure 6:
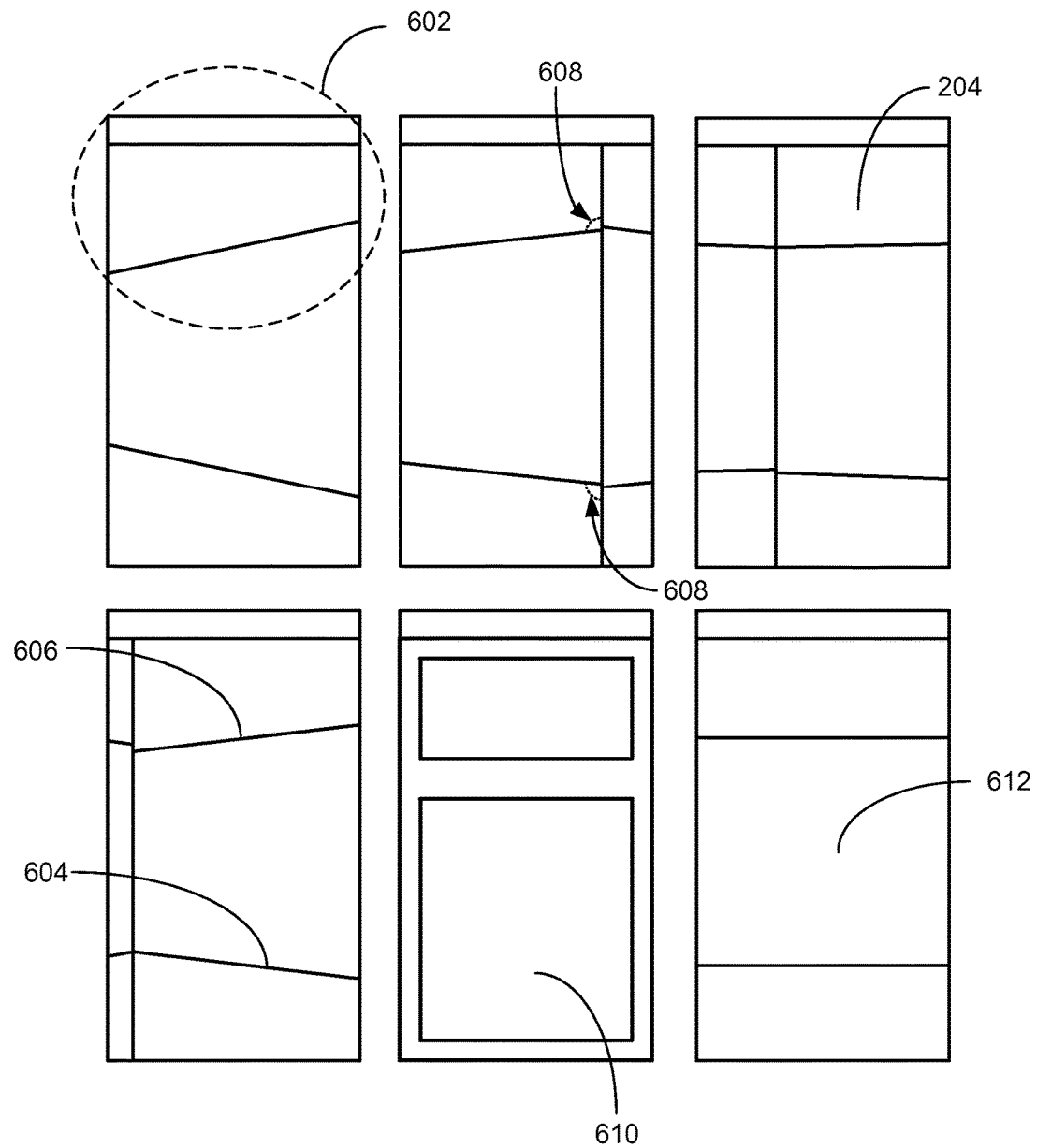
FIG. 6 is fifth examples of the display interface of the first device of FIG. 1.

Referring now to FIG. 6, therein is shown fifth examples of the display interface 202 of the first device 102 of FIG. 1. The panel dimension 224 of FIG. 2 can be defined by an interface shape 602, which is a contour of the interface panel 204. For example, the interface shape 602 can include a polygon, a circle, an amorphous shape, or a combination thereof. For further example, the interface shape 602 can include a polygon such as a shape of a shard, a rectangle, a triangle, a square, or a combination thereof.

The interface panel 204 can include a slanted top side 604, a slanted bottom side 606, or a combination thereof. For example, the display interface 202 can display a plurality of the interface panel 204 having the slanted top side 604, the slanted bottom side 606, or a combination thereof.

A side angle 608 is an amount of rotation an extent of the interface panel 204 is to a side extent of the display interface 202. For example, the side angle 608 at left extent of the slanted top side 604 can represent 80 degrees and the right extent of the slanted top side 604 can represent 100 degrees. For another example, the side angle 608 at left extent of the slanted bottom side 606 can represent 100 degrees and the right extent of the slanted top side 604 can represent 80 degrees.

The interface page 402 of FIG. 4 can include a detail page 610, a related page 612, or a combination thereof. The electronic system 100 can provide the detail page 610 if the user of the electronic system 100 selects the interface panel 204 to provide further information for the content type 404 of FIG. 4. The related page 612 can represent the interface page 402 that is associated to the detail page 610. For example, the related page 612 can represent the same instance of the content type 404.

For further example, FIG. 6 can illustrate a sequence of the interface panel 204 having the slanted top side 604, the slanted bottom side 606, or a combination thereof changed by the electronic system 100. As an example, the side angle 608 of the slanted top side 604, the slanted bottom side 606, or a combination thereof can change as the user scroll through the interface panel 204.

Figure 7:
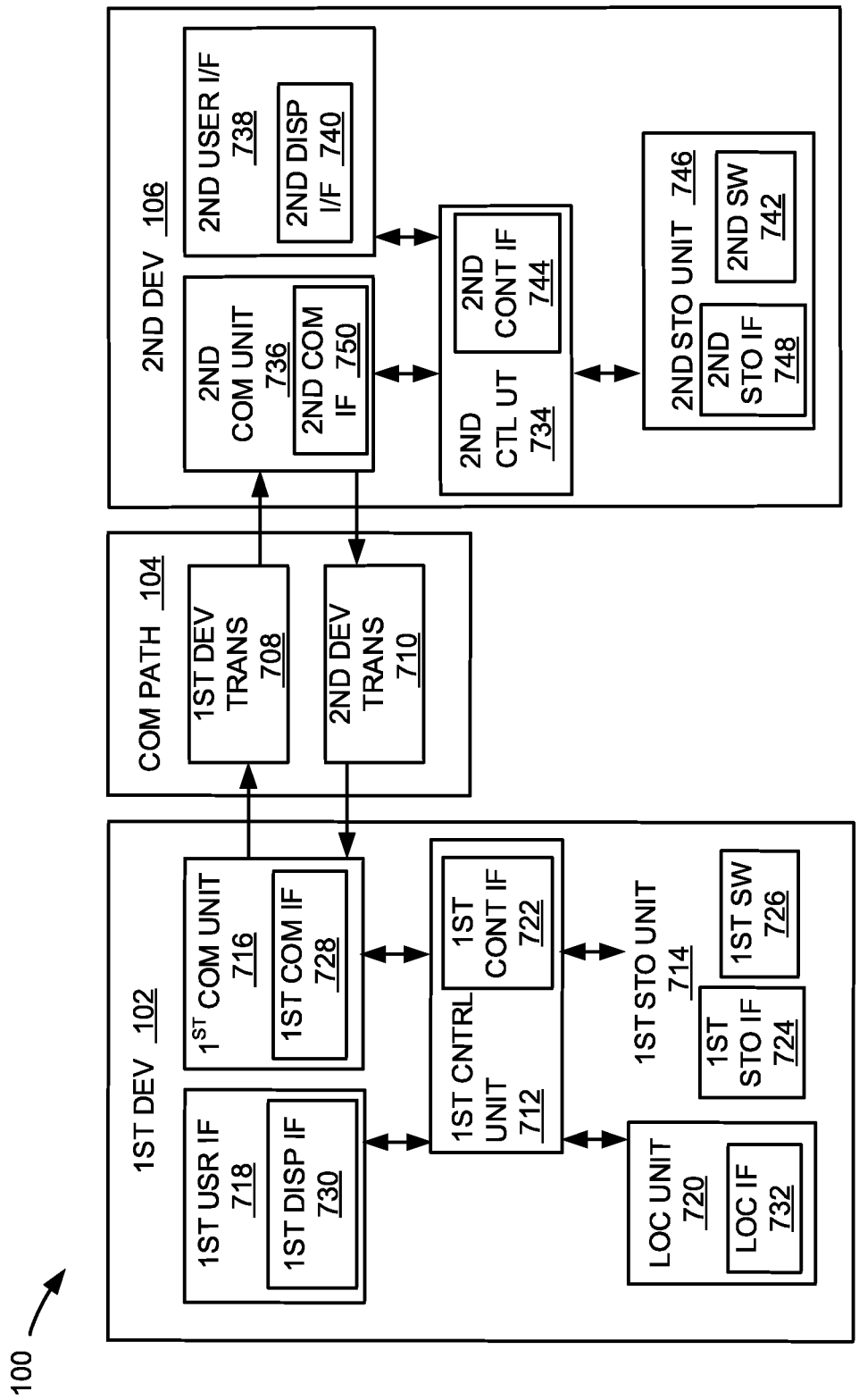
FIG. 7 is an exemplary block diagram of the electronic system.

Referring now to FIG. 7, therein is shown an exemplary block diagram of the electronic system 100. The electronic system 100 can include the first device 102, the communication path 104, and the second device 106. The first device 102 can send information in a first device transmission 708 over the communication path 104 to the second device 106. The second device 106 can send information in a second device transmission 710 over the communication path 104 to the first device 102.

For illustrative purposes, the electronic system 100 is shown with the first device 102 as a client device, although it is understood that the electronic system 100 can have the first device 102 as a different type of device. For example, the first device 102 can be a server having a display interface.

Also for illustrative purposes, the electronic system 100 is shown with the second device 106 as a server, although it is understood that the electronic system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of the present invention.

The first device 102 can include a first control unit 712, a first storage unit 714, a first communication unit 716, a first user interface 718, and a location unit 720. The first control unit 712 can include a first control interface 722. The first control unit 712 can execute a first software 726 to provide the intelligence of the electronic system 100.

The first control unit 712 can be implemented in a number of different manners. For example, the first control unit 712 can be a processor, an application specific integrated circuit (ASIC) an embedded processor, a microprocessor, a hardware control logic, a hardware finite state machine (FSM), a digital signal processor (DSP), or a combination thereof. The first control interface 722 can be used for communication between the first control unit 712 and other functional units in the first device 102. The first control interface 722 can also be used for communication that is external to the first device 102.

The first control interface 722 can receive information from the other functional units or from external sources, or can transmit information to the other functional units or to external destinations. The external sources and the external destinations refer to sources and destinations physically separate from to the first device 102.

The first control interface 722 can be implemented in different ways and can include different implementations depending on which functional units or external units are being interfaced with the first control interface 722. For example, the first control interface 722 can be implemented with a pressure sensor, an inertial sensor, a microelectromechanical system (MEMS), optical circuitry, waveguides, wireless circuitry, wireline circuitry, or a combination thereof.

The location unit 720 can generate location information, current heading, and current speed of the first device 102, as examples. The location unit 720 can be implemented in many ways. For example, the location unit 720 can function as at least a part of a global positioning system (GPS), an inertial navigation system, a cellular-tower location system, a pressure location system, or any combination thereof.

The location unit 720 can include a location interface 732. The location interface 732 can be used for communication between the location unit 720 and other functional units in the first device 102. The location interface 732 can also be used for communication that is external to the first device 102.

The location interface 732 can receive information from the other functional units or from external sources, or can transmit information to the other functional units or to external destinations. The external sources and the external destinations refer to sources and destinations physically separate from the first device 102.

The location interface 732 can include different implementations depending on which functional units or external units are being interfaced with the location unit 720. The location interface 732 can be implemented with technologies and techniques similar to the implementation of the first control interface 722.

The first storage unit 714 can store the first software 726. The first storage unit 714 can also store the relevant information, such as advertisements, points of interest (POI), navigation routing entries, or any combination thereof. The relevant information can also include news, media, events, or a combination thereof from the third party content provider.

The first storage unit 714 can be a volatile memory, a nonvolatile memory, an internal memory, an external memory, or a combination thereof. For example, the first storage unit 714 can be a nonvolatile storage such as non-volatile random access memory (NVRAM), Flash memory, disk storage, or a volatile storage such as static random access memory (SRAM).

The first storage unit 714 can include a first storage interface 724. The first storage interface 724 can be used for communication between and other functional units in the first device 102. The first storage interface 724 can also be used for communication that is external to the first device 102.

The first storage interface 724 can receive information from the other functional units or from external sources, or can transmit information to the other functional units or to external destinations. The external sources and the external destinations refer to sources and destinations physically separate from the first device 102.

The first storage interface 724 can include different implementations depending on which functional units or external units are being interfaced with the first storage unit 714. The first storage interface 724 can be implemented with technologies and techniques similar to the implementation of the first control interface 722.

The first communication unit 716 can enable external communication to and from the first device 102. For example, the first communication unit 716 can permit the first device 102 to communicate with the second device 106 of FIG. 1, an attachment, such as a peripheral device or a computer desktop, and the communication path 104.

The first communication unit 716 can also function as a communication hub allowing the first device 102 to function as part of the communication path 104 and not limited to be an end point or terminal unit to the communication path 104. The first communication unit 716 can include active and passive components, such as microelectronics or an antenna, for interaction with the communication path 104.

The first communication unit 716 can include a first communication interface 728. The first communication interface 728 can be used for communication between the first communication unit 716 and other functional units in the first device 102. The first communication interface 728 can receive information from the other functional units or can transmit information to the other functional units.

The first communication interface 728 can include different implementations depending on which functional units are being interfaced with the first communication unit 716. The first communication interface 728 can be implemented with technologies and techniques similar to the implementation of the first control interface 722.

The first user interface 718 allows a user (not shown) to interface and interact with the first device 102. The first user interface 718 can include an input device and an output device. Examples of the input device of the first user interface 718 can include a keypad, a touchpad, soft-keys, a keyboard, a microphone, an infrared sensor for receiving remote signals, or any combination thereof to provide data and communication inputs.

The first user interface 718 can include a first display interface 730. The first display interface 730 can include a display, a projector, a video screen, a speaker, or any combination thereof.

The first control unit 712 can operate the first user interface 718 to display information generated by the electronic system 100. The first control unit 712 can also execute the first software 726 for the other functions of the electronic system 100, including receiving location information from the location unit 720. The first control unit 712 can further execute the first software 726 for interaction with the communication path 104 via the first communication unit 716.

The second device 106 can be optimized for implementing the embodiment of the present invention in a multiple device embodiment with the first device 102. The second device 106 can provide the additional or higher performance processing power compared to the first device 102. The second device 106 can include a second control unit 734, a second communication unit 736, and a second user interface 738.

The second user interface 738 allows a user (not shown) to interface and interact with the second device 106. The second user interface 738 can include an input device and an output device. Examples of the input device of the second user interface 738 can include a keypad, a touchpad, softkeys, a keyboard, a microphone, or any combination thereof to provide data and communication inputs. Examples of the output device of the second user interface 738 can include a second display interface 740. The second display interface 740 can include a display, a projector, a video screen, a speaker, or any combination thereof.

The second control unit 734 can execute a second software 742 to provide the intelligence of the second device 106 of the electronic system 100. The second software 742 can operate in conjunction with the first software 726. The second control unit 734 can provide additional performance compared to the first control unit 712.

The second control unit 734 can operate the second user interface 738 to display information. The second control unit 734 can also execute the second software 742 for the other functions of the electronic system 100, including operating the second communication unit 736 to communicate with the first device 102 over the communication path 104.

The second control unit 734 can be implemented in a number of different manners. For example, the second control unit 734 can be a processor, an embedded processor, a microprocessor, hardware control logic, a hardware finite state machine (FSM), a digital signal processor (DSP), or a combination thereof.

The second control unit 734 can include a second control interface 744. The second control interface 744 can be used for communication between the second control unit 734 and other functional units in the second device 106. The second control interface 744 can also be used for communication that is external to the second device 106.

The second control interface 744 can receive information from the other functional units or from external sources, or can transmit information to the other functional units or to external destinations. The external sources and the external destinations refer to sources and destinations physically separate from the second device 106.

The second control interface 744 can be implemented in different ways and can include different implementations depending on which functional units or external units are being interfaced with the second control interface 744. For example, the second control interface 744 can be implemented with a pressure sensor, an inertial sensor, a microelectromechanical system (MEMS), optical circuitry, waveguides, wireless circuitry, wireline circuitry, or a combination thereof.

A second storage unit 746 can store the second software 742. The second storage unit 746 can also store the relevant information, such as advertisements, points of interest (POI), navigation routing entries, or any combination thereof. The second storage unit 746 can be sized to provide the additional storage capacity to supplement the first storage unit 714.

For illustrative purposes, the second storage unit 746 is shown as a single element, although it is understood that the second storage unit 746 can be a distribution of storage elements. Also for illustrative purposes, the electronic system 100 is shown with the second storage unit 746 as a single hierarchy storage system, although it is understood that the electronic system 100 can have the second storage unit 746 in a different configuration. For example, the second storage unit 746 can be formed with different storage technologies forming a memory hierarchal system including different levels of caching, main memory, rotating media, or off-line storage.

The second storage unit 746 can be a volatile memory, a nonvolatile memory, an internal memory, an external memory, or a combination thereof. For example, the second storage unit 746 can be a nonvolatile storage such as non-volatile random access memory (NVRAM), Flash memory, disk storage, or a volatile storage such as static random access memory (SRAM).

The second storage unit 746 can include a second storage interface 748. The second storage interface 748 can be used for communication between other functional units in the second device 106. The second storage interface 748 can also be used for communication that is external to the second device 106.

The second storage interface 748 can receive information from the other functional units or from external sources, or can transmit information to the other functional units or to external destinations. The external sources and the external destinations refer to sources and destinations physically separate from the second device 106.

The second storage interface 748 can include different implementations depending on which functional units or external units are being interfaced with the second storage unit 746. The second storage interface 748 can be implemented with technologies and techniques similar to the implementation of the second control interface 744.

The second communication unit 736 can enable external communication to and from the second device 106. For example, the second communication unit 736 can permit the second device 106 to communicate with the first device 102 over the communication path 104.

The second communication unit 736 can also function as a communication hub allowing the second device 106 to function as part of the communication path 104 and not limited to be an end point or terminal unit to the communication path 104. The second communication unit 736 can include active and passive components, such as microelectronics or an antenna, for interaction with the communication path 104.

The second communication unit 736 can include a second communication interface 750. The second communication interface 750 can be used for communication between the second communication unit 736 and other functional units in the second device 106. The second communication interface 750 can receive information from the other functional units or can transmit information to the other functional units.

The second communication interface 750 can include different implementations depending on which functional units are being interfaced with the second communication unit 736. The second communication interface 750 can be implemented with technologies and techniques similar to the implementation of the second control interface 744.

The first communication unit 716 can couple with the communication path 104 to send information to the second device 106 in the first device transmission 708. The second device 106 can receive information in the second communication unit 736 from the first device transmission 708 of the communication path 104.

The second communication unit 736 can couple with the communication path 104 to send information to the first device 102 in the second device transmission 710. The first device 102 can receive information in the first communication unit 716 from the second device transmission 710 of the communication path 104. The electronic system 100 can be executed by the first control unit 712, the second control unit 734, or a combination thereof. For illustrative purposes, the second device 106 is shown with the partition having the second user interface 738, the second storage unit 746, the second control unit 734, and the second communication unit 736, although it is understood that the second device 106 can have a different partition. For example, the second software 742 can be partitioned differently such that some or all of its function can be in the second control unit 734 and the second communication unit 736. Also, the second device 106 can include other functional units not shown in FIG. 7 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the electronic system 100 is described by operation of the first device 102 and the second device 106. It is understood that the first device 102 and the second device 106 can operate any of the modules and functions of the electronic system 100. For example, the first device 102 is described to operate the location unit 720, although it is understood that the second device 102 can also operate the location unit 720.

Figure 8:
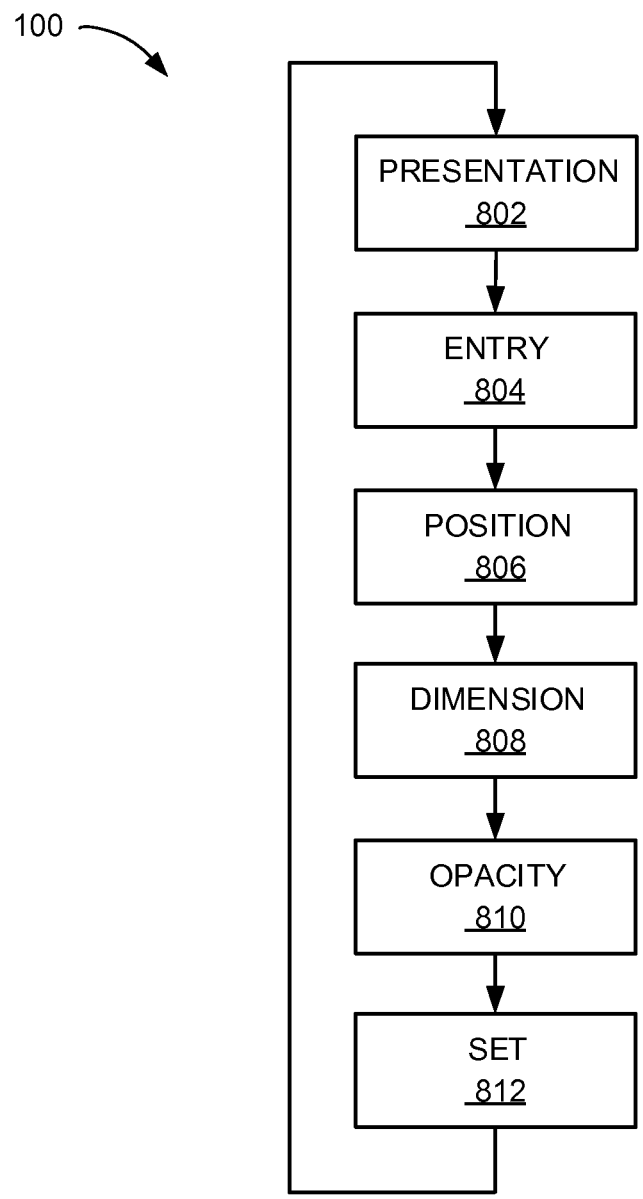
FIG. 8 is a control flow of the electronic system.

Referring now to FIG. 8, therein is shown a control flow of the electronic system 100 of FIG. 1. The electronic system 100 can include a presentation module 802. The presentation module 802 provides the interface panel 204 of FIG. 2. For example, the presentation module 802 can provide a plurality of the interface panel 204 for displaying on the display interface 202 of FIG. 2 of the first device 102.

The presentation module 802 can provide the interface panel 204 in a number of ways. For example, the presentation module 802 can provide a plurality of the interface panel 204 contiguously connected at the top extent, the bottom extent, or a combination thereof of each instances of the interface panel 204. For another example, the presentation module 802 can provide one instance of the interface panel 204 overlapping another instance of the interface panel 204. Details will be discussed below.

The presentation module 802 can provide the interface panel 204 based on the view type 206 of FIG. 2. As an example, the presentation module 802 can provide the interface panel 204 in the view type 206 representing the peek view 208 of FIG. 2. The presentation module 802 can provide the interface panel 204 in the view type 206 representing the contracted view 210 of FIG. 2.

For further example, the presentation module 802 can provide the interface list 302 of FIG. 3 of the interface panel 204. The interface list 302 can represent an array. For example, the interface list 302 can include a plurality of the interface panel 204. More specifically, the interface list 302 can include the item count 304 of FIG. 3 representing "N" number of the interface panel 204.

For example, the presentation module 802 can provide the interface panel 204 representing the first instance of the interface list 302 as the first instance of the interface panel 204 to be displayed on the display interface 202. More specifically, the presentation module 802 can provide the first instance of the interface panel 204 contiguous to the top extent of the display interface 202.

For further example, the presentation module 802 can expand the first instance of the interface panel 204 in to the peek view 208 to disclose the subpanel 212 of FIG. 2 for displaying the preview 214 of FIG. 2. The presentation module 802 can provide the subsequent instance of the interface panel 204 in the view type 206 of the contracted view 210 to hide the preview 214. The presentation module 802 can provide "N" number of subsequent instances of the interface panel 204 based on the item count 304, the display threshold 306 of FIG. 3, or a combination thereof. Details regarding expanding the interface panel 204 will be discussed below.

For further example, the presentation module 802 can provide the interface panel 204 including the panel position 308 of FIG. 3, the panel dimension 224 of FIG. 2, the interface opacity 218 of FIG. 2, or a combination thereof. For a specific example, the presentation module 802 can provide the first instance of the interface panel 204 from the interface list 302 at the panel position 308 closest to the top extent of the display interface 202. More specifically, the presentation module 802 can provide the interface panel 204 at the position type 310 of FIG. 3 representing the vertical position 312 of FIG. 3 closest to the top extent of the display interface 202.

The presentation module 802 can provide the subsequent instance of the interface panel 204 from the interface list 302 at the subsequent instance of the vertical position 312 aligned at the vertical position 312 below where the first instance of the interface panel 204 is positioned. More specifically, the presentation module 802 can provide the subsequent instances of the interface panel 204 from the interface list 302 to fill the remaining surface area of the display interface 202.

Continuing with the example, the presentation module 802 can provide the first instance of the interface panel 204 with the panel dimension 224 of an expanded instance of the interface vertical side 216 of FIG. 2 for disclosing the subpanel 212 to display the preview 214 in the peek view 208. The presentation module 802 can provide the subsequent instance of the interface panel 204 with the panel dimension 224 having an instance with a height of the interface vertical side 216 sufficient to hide the preview 214 in the contracted view 210.

For a specific example, the display threshold 306 can represent four instances of the interface panel 204 including one instance of the interface panel 204 in the peek view 208 and three instances of the interface panel 204 in the contracted view 210 displayable on the display interface 202. As a result, the presentation module 802 can provide four instances of the interface panel 204 for displaying on the display interface 202 at a time, as an example.

The presentation module 802 can provide the interface panel 204 with a different degree of the interface opacity 218. More specifically, the presentation module 802 can provide the interface panel 204 in the view type 206 of the peek view 208 having a plurality of the interface opacity 218. For example, the presentation module 802 can provide the subpanel 212 displaying the preview 214 to be darker than the remaining surface area of the interface panel 204. Details regarding the different degree of the interface opacity 218 will be discussed below. The presentation module 802 can communicate the interface panel 204 to an entry module 804.

The electronic system 100 can include the entry module 804, which can couple to the presentation module 802. The entry module 804 determines the gesture type 318 of FIG. 3. For example, the entry module 804 can determine the gesture type 318 of the user entry 316 of FIG. 3 received.

The entry module 804 can determine the gesture type 318 in a number of ways. For example, the entry module 804 can determine the gesture type 318 based on the user entry 316 representing a swipe, a long press, a scrub, a scroll, a tilt, or a combination thereof as discussed above. For further example, the entry module 804 can determine the gesture type 318 based on the gesture direction 322 of FIG. 3, the gesture speed 324 of FIG. 3, the device orientation 502 of FIG. 5, or a combination thereof.

For a specific example, the entry module 804 can determine the gesture direction 322 by detecting the activation spot 320 of FIG. 3 move along the display interface 202 from the initial spot 332 of FIG. 3 to the subsequent spot 334 of FIG. 3 according to the cardinal direction. For another example, the entry module 804 can determine the gesture direction 322 based on detecting the activation spot 320 change on the interface panel 204, the display interface 202, or a combination thereof.

For another example, the entry module 804 can determine the gesture speed 324 of the user entry 316. The entry module 804 can determine the gesture speed 324 based on how fast the activation spot 320 changes within the interface panel 204, the display interface 202, or a combination thereof. As an example, the entry module 804 can determine the gesture speed 324 based on the activation spot 320 changing from the initial spot 332 to the subsequent spot 334 by taking greater than, equal to, or less than 1 second. For a specific example, the entry module 804 can determine the gesture type 318 to represent a scroll if the gesture speed 324 is less than a second.

For another example, the entry module 804 can determine the device orientation 502. More specifically, the entry module 804 can determine the device orientation 502 of whether first device 102 is oriented as the vertical mode 504 of FIG. 5 or the horizontal mode 506 of FIG. 5. For example, the entry module 804 can determine the device orientation 502 of the vertical mode 504 with the gyroscope of the first device 102 detecting the short display side 508 of FIG. 5 as the top extent of the first device 102. In contrast, the entry module 804 can determine the device orientation 502 of the horizontal mode 506 with the gyroscope of the first device 102 detecting the long display side 510 of FIG. 5 as the top extent of the first device 102. The entry module 804 can communicate the gesture type 318 to a position module 806.

The electronic system 100 can include the position module 806, which can couple to the entry module 804. The position module 806 determines the panel position 308. For example, the position module 806 can determine the panel position 308 based on the gesture type 318, the position type 310, the item count 304, the display threshold 306, the device orientation 502, or a combination thereof.

The position module 806 can determine the panel position 308 in a number of ways. For example, the position module 806 can determine the panel position 308 representing the focus position 314 of FIG. 3. More specifically, the position module 806 can determine the focus position 314 of the interface panel 204 based on the position type 310, the gesture direction 322, the gesture type 318, the item count 304, the display threshold 306, the device orientation 502, or a combination thereof.

For example, the device orientation 502 can represent the vertical mode 504. The position module 806 can determine the focus position 314 of the first instance of the interface panel 204 from the interface list 302 to be at the vertical position 312 closest to the top extent of the display interface 202.

The position module 806 can update the focus position 314 based on the gesture type 318 representing a scroll. The gesture direction 322 of the scroll can represent a vertical scroll or scroll towards the top or bottom extent of the display interface 202. Based on the vertical scroll, the position module 806 can update the focus position 314 to the subsequent instance of the vertical position 312. More specifically, based on the vertical scroll, the position module 806 can update the focus position 314 to the subsequent instance of the interface panel 204 in the interface list 302.

As the user continues to perform the gesture type 318 of the scroll with the gesture direction 322 towards the top or bottom extent of the display interface 202, the position module 806 can continue to update the focus position 314 to the subsequent instance of the vertical position 312. More specifically, if the vertical scroll is towards the top extent of the display interface 202, the position module 806 can update the focus position 314 to the instance of the vertical position 312 that is below. In contrast, if the vertical scroll is towards the bottom extent of the display interface 202, the position module 806 can update the focus position 314 to the instance of the vertical position 312 that is above.

For a different example, the position module 806 can update the focus position 314 based on the item count 304 in the interface list 302. For example, the user of the electronic system 100 can scroll a plurality of the interface panel 204 limited to the item count 304 in the interface list 302. As a result, the position module 806 can update the focus position 314 "N" times equivalent to the item count 304. More specifically, while the last instance of the interface panel 204 from the interface list 302 is not displayed on the display interface 202, the position module 806 can maintain the focus position 314 at the vertical position 312 closest to the top extent of the display interface 202.

For a specific example, the position module 806 can update the focus position 314 based on the item count 304, the display threshold 306, or a combination thereof. The item count 304 can represent ten. The display threshold 306 can represent four. As a result, a number of the interface panel 204 displayed on the display interface 202 can represent four, as discussed above.

Continuing with the example, the display threshold 306 can represent four instances of the interface panel 204 including one instance of the interface panel 204 in the peek view 208 and three instances of the interface panel 204 in the contracted view 210 displayable on the display interface 202. While the tenth instance of the interface panel 204 from the interface list 302 is not displayed on the display interface 202, the position module 806 can determine the focus position 314 to represent the vertical position 312 closest to the top extent of the display interface 202.

For example, the display interface 202 can display the first instance, the second instance, the third instance, and the fourth instance of the interface panel 204. The user can perform the vertical scroll to move the second instance of the interface panel 204 towards the top extent of the display interface 202. The position module 806 can move the second instance of the interface panel 204 in the vertical position 312 initially occupied by the first instance of the interface panel 204. The display interface 202 can now display the second instance, the third instance, the fourth instance, and the fifth instance of the interface panel 204. Since the tenth instance of the interface panel 204 from the interface list 302 is not displayed on the display interface 202, the position module 806 can determine the focus position 314 to represent the vertical position 312 of the second instance of the interface panel 204.

Continuing with the example, the user can continue to scroll the plurality of the interface panel 204 displayed on the display interface 202. Eventually, the display interface 202 can display the tenth instance or the last instance of the interface panel 204 from the interface list 302. The position module 806 can update the focus position 314 to the vertical position 312 below the vertical position 312 closest to the top extent of the display interface 202 based on interface panel 204, the item count 304, or a combination thereof. More specifically, if the last instance of the interface panel 204 from the interface list 302 is displayed on the display interface 202, the position module 806 can update the focus position 314 to the instances of the vertical position 312 below an instance of the vertical position 312 closest to the top extent of the display interface 202.

For example, the display interface 202 can display the seventh instance, the eighth instance, the ninth instance, and the tenth instance of the interface panel 204. The user can perform the gesture type 318 representing a scroll with the gesture direction 322 towards the top extent of the display interface. Rather than moving the eighth instance of the interface panel 204 into the vertical position 312 of the seventh instance of the interface panel 204, the position module 806 can determine the focus position 314 to represent the current instance of the vertical position 312 where the eighth instance of the interface panel 204 is located.

The position module 806 can update the focus position 314 to the subsequent instance of the vertical position 312 until the focus position 314 reaches the vertical position 312 of the last instance of the interface panel 204 from the interface list 302. The position module 806 can communicate the panel position 308 representing the focus position 314 to a dimension module 808.

The electronic system 100 can include the dimension module 808, which can couple to the position module 806. The dimension module 808 determines the panel dimension 224. For example, the dimension module 808 can determine the panel dimension 224 based on the focus position 314.

The dimension module 808 can determine the panel dimension 224 in a number of ways. For example, the dimension module 808 can determine the panel dimension 224 based on the whether interface panel 204 is at the focus position 314. More specifically, if the interface panel 204 is at the focus position 314, the dimension module 808 can expand the panel dimension 224 for the interface panel 204. For a specific example, the dimension module 808 can expand the interface vertical side 216 to disclose the subpanel 212 for the interface panel 204 at the focus position 314.

For further example, the focus position 314 can be moved from the first instance of the interface panel 204 to the second instance of the interface panel 204. Initially, the first instance of the interface panel 204 can be in the peek view 208 while the second instance of the interface panel 204 can be in the contracted view 210.

When the focus position 314 is changed to the second instance of the interface panel 204, the dimension module 808 can expand the interface vertical side 216 of the second instance of the interface panel 204 to disclose the subpanel 212 for the second instance of the interface panel 204. The dimension module 808 can contract the interface vertical side 216 for the first instance of the interface panel 204 to hide the subpanel 212 for the first instance of the interface panel 204. Moreover, the dimension module 808 can update the panel dimension 224 for the second instance of the interface panel 204 to be in the peek view 208 and can update the panel dimension 224 for the first instance of the interface panel 204 to be in the contracted view 210.

For further example, the dimension module 808 can update the panel dimension 224 based on the adjustment degree 326 of FIG. 3. More specifically, the dimension module 808 can expand or contract the panel dimension 224 based on the adjustment degree 326. As discussed above, the maximum height for the interface vertical side 216 for the panel dimension 224 can represent the interface panel 204 in the peek view 208. In contrast, the minimum height for the interface vertical side 216 for the panel dimension 224 can represent the interface panel 204 in the contracted view 210.

For example, the dimension module 808 can expand the interface vertical side 216 to update the panel dimension 224 for the interface panel 204 in the contracted view 210 into the peek view 208. More specifically, as the interface panel 204 in the contracted view 210 is scrolled by the user to move into the focus position 314, the interface vertical side 216 of the interface panel 204 moving into the focus position 314 can be expanded by the dimension module 808 to convert the interface panel 204 into the peek view 208.

Moreover, the dimension module 808 can expand the interface vertical side 216 of the interface panel 204 in the contracted view 210 at the adjustment degree 326 to gradually reach the maximum height of the interface vertical side 216 when the interface panel 204 is in the peek view 208. The user can stop the vertical scroll before the dimension module 808 expands the interface vertical side 216 to the maximum height. Or stated differently, the dimension module 808 can expand the interface vertical side 216 to the adjustment degree 326 of 50% of the maximum height of the interface vertical side 216 when the interface panel 204 is in the peek view 208.

For a different example, the dimension module 808 can contract the interface vertical side 216 based on the adjustment degree 326 similarly as expanding the interface vertical side 216. More specifically, the dimension module 808 can contract the interface vertical side 216 based on the adjustment degree 326 for the interface panel 204 in the peek view 208 to be converted into the contracted view 210.

For further example, the dimension module 808 can update the panel dimension 224 based on the gesture speed 324. More specifically, the quicker the gesture speed 324, the faster the adjustment degree 326 can change. As a result, the dimension module 808 can expand or contract the interface vertical side 216 based on the gesture speed 324 to change the adjustment degree 326. The dimension module 808 can communicate the panel dimension 224 to an opacity module 810.

The electronic system 100 can include the opacity module 810, which can couple to the dimension module 808. The opacity module 810 determines the interface opacity 218. For example, the opacity module 810 can determine the interface opacity 218 based on the interface panel 204, the view type 206, the panel position 308, or a combination thereof.

It has been discovered that the electronic system 100 determining the panel dimension 224 based on expanding or contracting the interface vertical side 216 improves the efficiency of presenting the content. By expanding or contracting the interface vertical side 216, the electronic system 100 can maximize the presentation of the content on the display interface 202. As a result, the electronic system 100 can enhance the user experience for operating the first device 102, the electronic system 100, or a combination thereof.

The opacity module 810 can determine the interface opacity 218 in a number of ways. For example, as discussed above, the first instance of the interface panel 204 in the peek view 208 can have the subpanel 212 displaying the preview 214 to be darker than the remaining surface area of the interface panel 204. The opacity module 810 can determine the interface opacity 218 of the subpanel 212 to be darker based on darkening the interface color 220 of FIG. 2 for the subpanel 212 relative to the remaining surface are of the interface panel 204.

More specifically, the opacity module 810 can determine the interface color 220 for the interface panel 204 excluding the subpanel 212 based on extracting the color including red, green, blue, or a combination thereof. The opacity module 810 can determine the interface color 220 of the subpanel 212 to be darker based on multiplying the interface color 220 extracted with the luminosity factor 222 of FIG. 2. The luminosity factor 222, for example, can represent 20% darker. As a result, the opacity module 810 can determine the interface opacity 218 of the subpanel 212 to be, for example, 20% darker than the interface opacity 218 of the surface area of the interface panel 204 outside of the subpanel 212. As a result, the opacity module 810 can improve the readability of the text, image, or a combination thereof displayed on the interface panel 204, the subpanel 212, or a combination thereof by creating a contrast between the interface color 220 of the interface panel 204 and the interface color 220 of the subpanel 212.

For another example, the opacity module 810 can determine the interface color 220 for the text within the interface panel 204, the subpanel 212, or a combination thereof. More specifically, similarly discussed above, the opacity module 810 can update the interface color 220 of the text for creating the contrast between the interface color 220 of the text within the interface panel 204 and the interface color 220 of the text within the subpanel 212 for improving readability. As discussed above, the opacity module 810 can update the interface color 220 of the text to be brighter or darker by multiplying the luminosity factor 222 to the interface color 220.

For further example, the opacity module 810 can update the interface opacity 218 based on the focus position 314. More specifically, as the subsequent instance of the interface panel 204 moves into the focus position 314, the interface panel 204 can convert from the contracted view 210 to the peek view 208. As a result, the opacity module 810 can update the interface opacity 218 of the subsequent instance of the interface panel 204 by changing the interface opacity 218 of the subpanel 212 now being disclosed. The previous instance of the interface panel 204 can be converted from the peek view 208 into the contracted view 210. The interface opacity 218 of the interface panel 204 now in the contracted view 210 can remain the same as the interface color 220 of the surface area of the interface panel 204 outside of the subpanel 212. The opacity module 810 can communicate the interface opacity 218 to a set module 812.

It has been discovered that the electronic system 100 determining the interface opacity 218 improves the efficiency of presenting the content on the display interface 202. By brightening or darkening the interface opacity 218 of the content including the image, text, or a combination thereof, the electronic system 100 can improve the readability of the content. As a result, the electronic system 100 can improve the user experience of operating the first device 102, the electronic system 100, or a combination thereof.

The electronic system 100 can include the set module 812, which can couple to the opacity module 810. The set module 812 determines the moving set 328 of FIG. 3. For example, the set module 812 can determine the moving set 328 based on the gesture speed 324, the interface panel 204, the item count 304, the display threshold 306, or a combination thereof.

The set module 812 can determine the moving set 328 in a number of ways. For example, the set module 812 can determine the moving set 328 based on the gesture speed 324 meeting or exceeding the speed threshold 330 of FIG. 3. More specifically, if the gesture speed 324 is below the speed threshold 330, the set module 812 can determine the moving set 328 to represent one instance of the interface panel 204. As a result, when the user scrolls for the interface panel 204, the display interface 202 can display the interface panel 204 being scrolled one instance at a time.

If the gesture speed 324 meets or exceeds the speed threshold 330, the set module 812 can determine the moving set 328 to represent more than one instance of the interface panel 204 but less than or equal to the item count 304, the display threshold 306, or a combination thereof. For example, the display threshold 306 can represent four. If the gesture speed 324 meets or exceeds the speed threshold 330, the set module 812 can determine the moving set 328 to represent four instances of the interface panel 204. As a result, when the user scrolls for the interface panel 204, the display interface 202 can display the interface panel 204 being scrolled four instances at a time.

For illustrative purposes, the electronic system 100 is described with the dimension module 808 determining the panel dimension 224 by changing the interface vertical side 216 based on whether the interface panel 204 is at the focus position 314, although it is understood that the dimension module 808 can operate differently. For example, the dimension module 808 can determine the panel dimension 224 based on the gesture speed 324 meeting or exceeding the speed threshold 330.

For a specific example, the dimension module 808 can update the panel dimension 224 by contracting the interface vertical side 216 gradually if the gesture speed 324 meets or exceeds the speed threshold 330. In contrast, the dimension module 808 can update the panel dimension 224 by extending the interface vertical side 216 gradually if the gesture speed 324 is below the speed threshold 330. More specifically, the amount of expansion or contraction of the interface vertical side 216 by the dimension module 808 can base on the percentage difference between the gesture speed 324 and the speed threshold 330. For example, the dimension module 808 can contract the interface vertical side 216 if the gesture speed 324 is 5% greater than the speed threshold 330 more slowly compared to if the gesture speed 324 is 10% greater than the speed threshold 330.

For illustrative purposes, the electronic system 100 is described with the presentation module 802 providing the interface panel 204, although it is understood that the presentation module 802 can operate differently. For example, the presentation module 802 can provide the interface page 402 of FIG. 4.

The presentation module 802 can provide the interface page 402 in a number of ways. For example, the presentation module 802 can provide the interface page 402 based on aggregating a plurality of the interface panel 204. More specifically, the presentation module 802 can limit the number of the instances of the interface panel 204 to be aggregated based on the display threshold 306. As an example, the display threshold 306 can represent three. The presentation module 802 can provide the interface page 402 based on aggregating three instances of the interface panel 204.

For another example, the presentation module 802 can provide the interface page 402 including a plurality of the interface panel 204 in various instances of the view type 206. As an example, the presentation module 802 can provide the interface page 402 including an instance of the interface panel 204 in the peek view 208, two instances of the interface panel 204 in the contracted view 210, or a combination thereof. The presentation module 802 can communicate the interface page 402 to the position module 806.

For illustrative purposes, the electronic system 100 is described with the position module 806 determining the focus position 314, although it is understood that the position module 806 can operate differently. For example, the position module 806 can determine the page coverage 406 of FIG. 4 of the interface page 402.

The position module 806 can determine the page coverage 406 in a number of ways. For example, the position module 806 can determine the page coverage 406 based on the gesture direction 322, the position type 310, or a combination thereof. The gesture direction 322 can represent a scroll from the left extent to the right extent or vice versa of the display interface 202. The position type 310 can represent the horizontal position 408 of FIG. 4.

The position module 806 can determine the page coverage 406 based on the page center 410 of FIG. 4 relative to the display center 412 of FIG. 4. More specifically, the position module 806 can compare the horizontal position 408 of the page center 410 to the display center 412 of the display interface 202. The position module 806 can determine the page coverage 406 based on the distance difference 414 of FIG. 4 between the page center 410 and the display center 412.

As illustrated in FIG. 4, if an instance of the interface page 402 is determined to have the page coverage 406 of 100%, the position module 806 can determine the page coverage 406 of 0% for another instance of the interface page 402. For another example, if the distance difference 414 represents half of the width of the interface page 402, the position module 806 can determine the page coverage 406 to represent 50% for the interface page 402. The position module 806 can communicate the page coverage 406 to the opacity module 810.

For illustrative purposes, the electronic system 100 is described with the opacity module 810 determining the interface opacity 218 of the interface panel 204, although it is understood that the opacity module 810 can operate differently. For example, the opacity module 810 can determine the page opacity 416 of FIG. 4 of the interface page 402.

The opacity module 810 can determine the page opacity 416 in a number of ways. For example, the opacity module 810 can determine the page opacity 416 based on the page coverage 406. More specifically, if an instance of the interface page 402 has a larger of the page coverage 406 than the page coverage 406 of another instance of the interface page 402, the opacity module 810 can determine the page opacity 416 for the interface page 402 with the lesser of the page coverage 406 to be darker than the interface page 402 with the larger of the page coverage 406.

For another example, if two instances of the interface page 402 can have equal coverage for the page coverage 406, the opacity module 810 can determine the page opacity 416 for the two instances of the interface page 402 to be equal. For further example, the opacity module 810 can determine the page opacity 416 based on the degree of the page coverage 406. More specifically, the opacity module 810 can determine the page opacity 416 for the page coverage 406 of 10% to be darker than the page opacity 416 for the page coverage 406 of 20%. Furthermore, the opacity module 810 can determine the page opacity 416 of the page coverage 406 of 100% to be the brightest while the page opacity 416 of the page coverage 406 of 0% to be the darkest.

The opacity module 810 can determine the page opacity 416 similarly as determining the interface opacity 218. For example, the opacity module 810 can determine the page opacity 416 based on the interface color 220, the luminosity factor 222, or a combination thereof. More specifically, the opacity module 810 can darken or brighten the interface color 220 of the interface page 402 based on multiplying the interface color 220 with the luminosity factor 222.

It has been discovered that the electronic system 100 determining the page opacity 416 based on the page coverage 406 improves the presentation of the content type 404 on the first device 102. By updating the page opacity 416 according to the to the page coverage 406, the electronic system 100 can improve the readability of the content type 404 most relevant to the user. As a result, the electronic system 100 can improve the user experience of operating the first device 102, the electronic system 100, or a combination thereof.

For illustrative purposes, the electronic system 100 is described with the presentation module 802 providing the interface panel 204, although it is understood that the presentation module 802 can operate differently. For example, the presentation module 802 can provide the interface panel 204 including the panel dimension 224 with the interface shape 602 of FIG. 6 representing the shard. More specifically, the presentation module 802 can provide a plurality of the interface panel 204. As an example, the display interface 202 can display three instances of the interface panel 204.

Continuing with the example, out of the three instances of the presentation module 802 can provide an instance of the interface panel 204 having the interface shape 602 of the shard overlapping another instance of the interface panel 204. More specifically, the overlapping instance of the interface panel 204 can include the slanted top side 604 of FIG. 6, the slanted bottom side 606 of FIG. 6, or a combination thereof.

For illustrative purposes, the electronic system 100 is described with the dimension module 808 determining the panel dimension 224 by changing the interface vertical side 216 based on whether the interface panel 204 is at the focus position 314, although it is understood that the dimension module 808 can operate differently. For example, the dimension module 808 can update the panel dimension 224 by changing the side angle 608 of FIG. 6 of the slanted top side 604, the slanted bottom side 606, or a combination thereof based on the gesture type 318, the gesture direction 322, or a combination thereof. For example, the gesture direction 322 can represent the horizontal scroll from the left to right on the display interface 202. The overlapping instances of the interface panel 204 can represent two instances of the interface panel 204 with the one instance having the panel position 308 closest to the top extent of the display interface 202 and another instance having the panel position 308 closest to the bottom extent of the display interface 202.

Continuing with the example, the dimension module 808 can change the side angle 608 of the slanted top side 604 for the interface panel 204 closest to the top extent of the display interface 202, can change the side angle 608 of the slanted bottom side 606 for the interface panel 204 closest to the bottom extent of the display interface 202, or a combination thereof. More specifically, the dimension module 808 can change the side angle 608 by pivoting the slanted top side 604, the slanted bottom side 606, or a combination thereof.

For example, as the user performs the horizontal scroll and a different instance of the interface page 402 is displayed on the display interface 202, the dimension module 808 can pivot the slanted top side 604, the slanted bottom side 606, or a combination thereof. As the transition to the new instance of the interface page 402 from the horizontal scroll is complete, the dimension module 808 can synchronize the pivoting of the slanted top side 604, the slanted bottom side 606, or a combination thereof to the completion of displaying of the interface page 402.

More specifically, as an example, the initial instance of the side angle 608 can represent 80 degrees at one extent and 100 degrees at another extent of the slanted top side 604, the slanted bottom side 606, or a combination thereof relative to the side extent of the display interface 202. The dimension module 808 can change the side angle 608 by pivoting the slanted top side 604, the slanted bottom side 606, or a combination thereof to have the side angle 608 of 70 degrees at one extent and the side angle 608 of 110 degrees at another extent. For further example, the dimension module 808 can change the side angle 608 in the same degree of angle, in the different degree of angle, or a combination thereof if the gesture direction 322 was from right to left instead of left to right.

The dimension module 808 can change the side angle 608 for just the slanted top side 604, just for the slanted bottom side 606, or both the slanted top side 604 and the slanted bottom side 606. For another example, the dimension module 808 can update the panel dimension 224 by changing the side angle 608 of the slanted top side 604, the slanted bottom side 606, or a combination thereof for the interface panel 204 representing a non-overlapping instance.

For another example, the dimension module 808 can change the interface vertical side 216 based on the gesture type 318, the gesture direction 322, or a combination thereof. More specifically, the dimension module 808 can expand or contract the interface vertical side 216 to relocate the slanted top side 604, the slanted bottom side 606, or a combination thereof. The overlapping instance of the interface panel 204 can represent the interface panel 204 closest to the display center of the display interface 202. The overlapped instances of the interface panel 204 can represent two instances of the interface panel 204 with the one instance having the panel position 308 closest to the top extent of the display interface 202 and another instance having the panel position 308 closest to the bottom extent of the display interface 202.

For example, if the gesture direction 322 can represent a vertical scroll from bottom to up, the dimension module 808 can expand the interface vertical side 216 to relocate the slanted top side 604 from the position closer than the previous position towards the top extent of the display interface 202. The dimension module 808 can maintain the position of the slanted bottom side 606.

In contrast, if the gesture direction 322 can represent a vertical scroll from the top to bottom, the dimension module 808 can expand the interface vertical side 216 to relocate the slanted bottom side 606 from the position closer than the previous position towards the bottom extent of the display interface 202. The dimension module 808 can maintain the position of the slanted top side 604.

For another example, if the gesture direction 322 can represent a vertical scroll, the dimension module 808 can expand the interface vertical side 216 to relocate both the slanted top side 604 from the position closer than the previous position towards the top extent of the display interface 202 and to relocate the slanted bottom side 606 from the position closer than the previous position towards the bottom extent of the display interface 202. In contrast, the dimension module 808 can maintain the position of the slanted top side 604, the slanted bottom side 606, or a combination thereof based on the gesture type 318.

For illustrative purposes, the electronic system 100 is described with the presentation module 802 providing the interface panel 204, although it is understood that the presentation module 802 can operate differently. For example, the presentation module 802 can provide the detail page 610 of FIG. 6. More specifically, the presentation module 802 can provide the detail page 610 based on the gesture type 318 of selecting the interface panel 204, the preview 214, or a combination thereof. For further example, the presentation module 802 can provide the interface page 402 including the interface panel 204, the preview 214, the detail page 610, or a combination thereof.

For a different example, the presentation module 802 can provide the related page 612 of FIG. 6 based on the gesture type 318 selecting the detail page 610. More specifically, if the user selected the detail page 610, the presentation module 802 can provide the related page 612 having the content type 404 that is same or similar to the detail page 610 selected by the user.

The physical transformation from changing the activation spot 320 from the initial spot 332 to the subsequent spot 334 based on the gesture direction 322 of the gesture type 318 results in the movement in the physical world, such as people using the first device 102, based on the operation of the electronic system 100. As the movement in the physical world occurs, the movement itself creates additional information that is converted back into providing the interface panel 204, the interface page 402, or a combination thereof for the continued operation of the electronic system 100 and to continue movement in the physical world.

The first software 726 of FIG. 7 of the first device 102 of FIG. 7 can include the electronic system 100. For example, the first software 726 can include the presentation module 802, the entry module 804, the position module 806, the dimension module 808, the opacity module 810, and the set module 812.

The first control unit 712 of FIG. 7 can execute the first software 726 for the presentation module 802 to provide the interface panel 204, the interface page 402, or a combination thereof. The first control unit 712 can execute the first software 726 for the entry module 804 to determine the gesture type 318. The first control unit 712 can execute the first software 726 for the position module 806 to determine the panel position 308, the focus position 314, the page coverage 406, or a combination thereof.

The first control unit 712 can execute the first software 726 for the dimension module 808 to determine the panel dimension 224. The first control unit 712 can execute the first software 726 for the opacity module 810 to determine the interface opacity 218. The first control unit 712 can execute the first software 726 for the set module 812 to determine the moving set 328.

The second software 742 of FIG. 7 of the second device 106 of FIG. 7 can include the electronic system 100. For example, the second software 742 can include the presentation module 802, the entry module 804, the position module 806, the dimension module 808, the opacity module 810, and the set module 812.

The second control unit 734 of FIG. 7 can execute the second software 742 for the presentation module 802 to provide the interface panel 204, the interface page 402, or a combination thereof. The second control unit 734 can execute the second software 742 for the entry module 804 to determine the gesture type 318. The second control unit 734 can execute the second software 742 for the position module 806 to determine the panel position 308, the focus position 314, the page coverage 406, or a combination thereof.

The second control unit 734 can execute the second software 742 for the dimension module 808 to determine the panel dimension 224. The second control unit 734 can execute the second software 742 for the opacity module 810 to determine the interface opacity 218. The second control unit 734 can execute the second software 742 for the set module 812 to determine the moving set 328.

The electronic system 100 can be partitioned between the first software 726 and the second software 742. For example, the second software 742 can include the position module 806, the dimension module 808, the opacity module 810, and the set module 812. The second control unit 734 can execute modules partitioned on the second software 742 as previously described.

The first software 726 can include the presentation module 802 and the entry module 804. Based on the size of the first storage unit 714, the first software 726 can include additional modules of the electronic system 100. The first control unit 712 can execute the modules partitioned on the first software 726 as previously described.

The first control unit 712 can operate the first communication interface 728 of FIG. 7 to communicate the gesture type 318, the panel position 308, the panel dimension 224, the interface opacity 218, the moving set 328, or a combination thereof to or from the second device 106. The first control unit 712 can operate the first software 726 to operate the location unit 720. The second communication interface 750 of FIG. 7 to communicate the gesture type 318, the panel position 308, the panel dimension 224, the interface opacity 218, the moving set 328, or a combination thereof to or from the first device 102. Furthermore, the presentation module 806 can represent the first user interface 718 of FIG. 7, the second user interface 738 of FIG. 7, or a combination thereof.

The electronic system 100 describes the module functions or order as an example. The modules can be partitioned differently. For example, the presentation module 802 and the entry module 804 can be combined. Each of the modules can operate individually and independently of the other modules. Furthermore, data generated in one module can be used by another module without being directly coupled to each other. For example, the set module 812 can receive the interface panel 204 from the presentation module 802.

The modules described in this application can be hardware implementation or hardware accelerators in the first control unit 712 or in the second control unit 734. The modules can also be hardware implementation or hardware accelerators within the first device 102 or the second device 106 but outside of the first control unit 712 or the second control unit 734, respectively as depicted in FIG. 7. However, it is understood that the first device 102, the second device 106, or a combination thereof can collectively refer to all hardware accelerators for the modules. Furthermore, the first device 102, the second device 106, or a combination thereof can be implemented as software, hardware, or a combination thereof.

The modules described in this application can be implemented as instructions stored on a non-transitory computer readable medium to be executed by the first device 102, the second device 106, or a combination thereof. The non-transitory computer medium can include the first storage unit 714, the second storage unit 746 of FIG. 7, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the electronic system 100 or installed as a removable portion of the electronic system 100.

Figure 9:
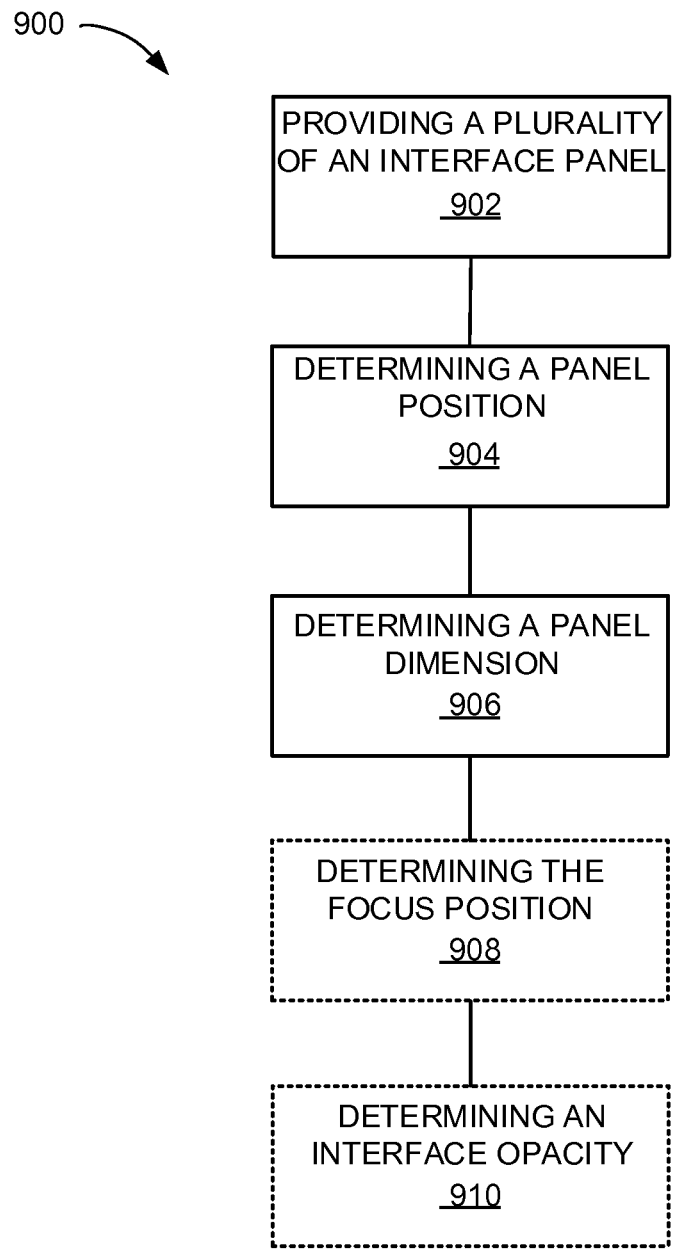
FIG. 9 is an exemplary flow chart of a method of operation of an electronic system in a further embodiment.

Referring now to FIG. 9, therein is shown an exemplary flow chart 900 of a method of operation of an electronic system in a further embodiment. The exemplary flow chart 900 of operation of the electronic system 100 in an embodiment of the present invention. The exemplary flow chart 900 includes: providing a plurality of an interface panel less than a display threshold for displaying on a device in a block 902; determining a panel position with a control unit for determining a view type for the plurality of the interface panel in a block 904; determining a panel dimension based on the panel position for expanding the interface panel in a focus position for displaying a subpanel in a block 906; determining the focus position based on an item count in an interface list in a block 908; and determining an interface opacity based on the view type for the subpanel having an interface color different from the interface panel in a block 910.

It has been discovered that the electronic system 100 providing a plurality of the interface panel 204 less than the display threshold 306 for displaying on the first device 102 improves the presentation of the content on the display interface 202. By determining the panel position 308, the electronic system 100 can determine the view type 206 for the plurality of the interface panel 204. Further, by determining the panel dimension 224 based on the panel position 308, the electronic system 100 can expand the interface panel 204 in the focus position 314 for displaying the subpanel 212. As a result, the electronic system 100 can enhance the user experience of operating the first device 102, the electronic system 100, or a combination thereof.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of the embodiment of the present invention is that it valuably supports and services the historical trend of reducing costs, simplifying systems, and increasing performance. These and other valuable aspects of the embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. An electronic system comprising:
   a user interface including a display interface for displaying on a device, the user interface configured to provide a plurality instances of an interface panel representing a graphical user interface less than a display threshold, wherein a number of instances of the interface panel available is limited to an item count within an interface list, wherein the display threshold represents a limit on a number of instances of the interface panel displayable on the display interface; and a control unit including a processor, coupled to the user interface, configured to:
   determine a panel position for determining a view type for an instance of the plurality instances of the interface panel,
   determine a panel dimension based on the panel position relative to a focus position for displaying a subpanel,
   update the panel dimension, in response to a gesture type of a user entry, based on a rate of expansion or contraction of an interface vertical side wherein the rate reflects a percentage difference between a gesture speed and a speed threshold,
   provide a interface page based on aggregating the plurality instances of the interface panel, and
   determine a plurality instances of a page coverage based on a distance difference between a page center of the interface page and a display center of the display interface wherein the page coverage represents an amount of a surface area of the display interface covered by the interface page.

2. The system as claimed in claim 1 wherein the control unit is configured to determine an interface opacity based on the view type for the subpanel having an interface color different from the interface panel.

3. The system as claimed in claim 1 wherein the control unit is configured to determine the page coverage of the interface page for determining a page opacity.

4. The system as claimed in claim 1 wherein the control unit is configured to change a side angle by pivoting a slanted top side, a slanted bottom side, or a combination thereof based on a gesture direction.

5. The system as claimed in claim 1 wherein the control unit is configured to update the panel dimension based on the gesture speed for changing an adjustment degree of the panel dimension.

6. The system as claimed in claim 1 wherein the control unit is configured to determine an interface opacity based on the focus position for an instance of the interface panel in the focus position including an interface color different from another instance of the interface panel in the panel position different from the focus position.

7. The system as claimed in claim 1 wherein the control unit is configured to determine a moving set based on the gesture speed meeting or exceeding the speed threshold.

8. The system as claimed in claim 1 wherein the control unit is configured to update the panel dimension by changing a side angle of a slanted top side, a slanted bottom side, or a combination thereof based on the gesture type.

9. The system as claimed in claim 1 wherein the control unit is configured to determine the page coverage based on a distance difference between a page center of the interface page and a display center of a display interface.

10. The system as claimed in claim 1 wherein the control unit is configured to provide the interface page including the plurality instances of the interface panel in a peek view, a contracted view, or a combination thereof.

11. A method of operation of an electronic system comprising:
   providing a plurality instances of an interface panel less than a display threshold, wherein a number of instances of the interface panel available is limited to an item count within an interface list, wherein the display threshold represents a limit on a number of instances of the interface panel displayable on the display interface;
   determining a panel position with a control unit for determining a view type for an instance of the plurality instances of the interface panel;
   determining a panel dimension based on the panel position relative to a focus position for displaying a subpanel;
   updating the panel dimension, in response to a gesture type of a user entry, based on a rate of expansion or contraction of an interface vertical side wherein the rate reflects a percentage difference between a gesture speed and a speed threshold
   providing a interface page based on aggregating the plurality instances of the interface panel, and
   determining a plurality instances of a page coverage based on a distance difference between a page center of the interface page and a display center of the display interface wherein the page coverage represents an amount of a surface area of the display interface covered by the interface page.

12. The method as claimed in claim 11 further comprising determining an interface opacity based on the view type for the subpanel having an interface color different from the interface panel.

13. The method as claimed in claim 11 further comprising determining the page coverage of the interface page for determining a page opacity.

14. The method as claimed in claim 11 further comprising changing a side angle by pivoting a slanted top side, a slanted bottom side, or a combination thereof based on a gesture direction.

15. The method as claimed in claim 11 further comprising updating the panel dimension based on the gesture speed for changing an adjustment degree of the panel dimension.

16. A user interface including a display interface configured to display:
   an interface page including a page opacity based on a page coverage;
   a plurality instances of an interface panel representing a graphical user interface within the interface page displayed, less than a display threshold, wherein a number of instances of the interface panel available is limited to an item count within an interface list, wherein the display threshold represents a limit on a number of instances of the interface panel displayable on the display interface, in a view type based on a panel position, wherein a panel dimension updated, in response to a gesture type of a user entry, based on a rate expansion or contraction of an interface vertical side wherein the rate reflects a percentage difference between a gesture speed and a speed threshold;
   a subpanel within the interface panel having an interface opacity different from the interface panel;
wherein:
   the interface page including the plurality instances of the interface panel to determine a plurality instances of the page coverage based on a distance difference between a page center of the interface page and a display center of the display interface wherein the page coverage represents an amount of a surface area of the display interface covered by the interface page.

17. The user interface as claimed in claim 16 wherein a plurality of the interface panel having the panel dimension different from one another based on the panel position within the display interface.

18. The user interface as claimed in claim 16 wherein the interface panel is in a peek view for displaying the subpanel including a preview.

19. The user interface as claimed in claim 16 wherein the interface panel is in a contracted view for hiding the subpanel.

20. The user interface as claimed in claim 16 wherein the subpanel having the interface opacity different from the interface opacity of the interface panel based on a luminosity factor.

21. A non-transitory computer readable medium including instructions for execution by a control unit comprising:
providing a plurality instances of an interface panel less than a display threshold, wherein a number of instances of the interface panel available is limited to an item count within an interface list, wherein the display threshold represents a limit on a number of instances of the interface panel displayable on the display interface;
determining a panel position for determining a view type an instance for the plurality instances of the interface panel;
determining a panel dimension based on the panel position relative to a focus position for displaying a subpanel;
updating the panel dimension, in response to a gesture type of a user entry, based on a rate of expansion or contraction of an interface vertical side wherein the rate reflects a percentage difference between a gesture speed and a speed threshold,
providing a interface page based on aggregating the plurality instances of the interface panel, and
determining a plurality instances of a page coverage based on a distance difference between a page center of the interface page and a display center of the display interface wherein the page coverage represents an amount of a surface area of the display interface covered by the interface page.

22. The non-transitory computer readable medium as claimed in claim 21 further comprising determining an interface opacity based on the view type for the subpanel having an interface color different from the interface panel.

23. The non-transitory computer readable medium as claimed in claim 21 further comprising determining the page coverage of the interface page for determining a page opacity.

24. The non-transitory computer readable medium as claimed in claim 21 further comprising changing a side angle by pivoting a slanted top side, a slanted bottom side, or a combination thereof based on a gesture direction.

25. The non-transitory computer readable medium as claimed in claim 21 further comprising updating the panel dimension based on the gesture speed for changing an adjustment degree of the panel dimension.

* * * * *